J. K. DELANO.

ELECTRICAL STARTING AND IGNITION SYSTEM.

APPLICATION FILED MAR. 15, 1920.

Reissued Apr. 20, 1920.

14,842.

2 SHEETS—SHEET 1.

Inventor

James. K. Delano.

By R. A. Neeland his Attorney

J. K. DELANO.

ELECTRICAL STARTING AND IGNITION SYSTEM.

APPLICATION FILED MAR. 15, 1920.

Reissued Apr. 20, 1920.

14,842.

2 SHEETS—SHEET 2.

Inventor

James. K. Delano.

By R. F. Stewart his Attorney

UNITED STATES PATENT OFFICE.

JAMES K. DELANO, OF YONKERS, NEW YORK.

ELECTRICAL STARTING AND IGNITION SYSTEM.

14,842. Specification of Reissued Letters Patent. Reissued Apr. 20, 1920.

Original No. 1,330,520, dated February 10, 1920, Serial No. 97,274, filed May 13, 1916. Application for reissue filed March 15, 1920. Serial No. 366,069.

*To all whom it may concern:*

Be it known that I, JAMES K. DELANO, a citizen of the United States, residing at Yonkers, in the county of Westchester and State of New York, have invented certain new and useful Improvements in Electrical Starting and Ignition Systems; and I do hereby declare the following to be a full, clear, and exact description of the invention, such as will enable others skilled in the art to which it appertains to make and use the same.

This invention relates to electrical starting and ignition systems for use with internal combustion engines; and it relates more particularly to systems employed on self-propelled vehicles, wherein dynamo electric means, operating in conjunction with a storage battery, is arranged to take power from the battery to start or crank an internal combustion engine, and also to generate and store electrical energy in the battery while the engine is running normally. An important feature of the invention is the provision of means operating automatically to prevent the battery from discharging through the electric machine armature or through the ignition circuit, in case the engine stops or stalls for any reason, the arrangement being such, however, that during the starting or cranking operation, the automatically operating means aforesaid is short-circuited, bridged, or otherwise rendered incapable of being actuated by the heavy current drawn from the battery by the dynamo electric machine in turning the engine over.

The accompanying drawings illustrate a desirable practicable embodiment of the invention; but it is to be understood that the invention is not limited to the specific arrangement shown.

Figure 1:
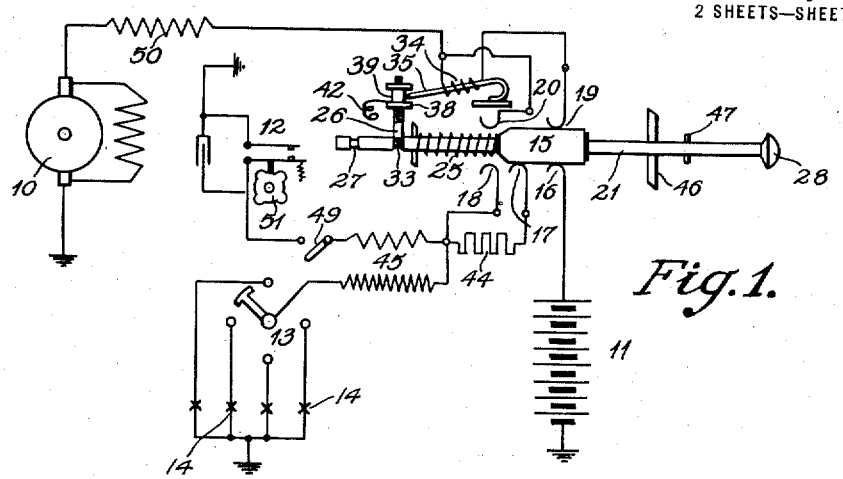
Figure 1 is a circuit layout of a starting and ignition system within the invention.
Figure 3:
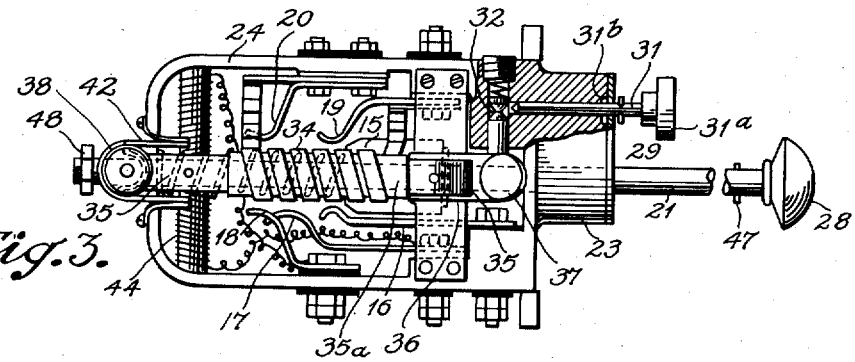
Fig. 3 is a plan of Fig. 2, partly in section, with the cover removed.
Figure 2:
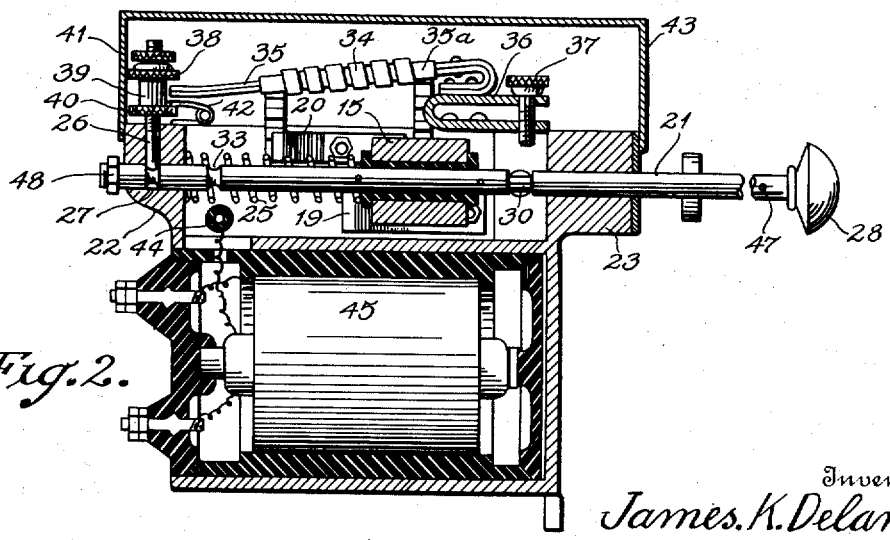
Fig. 2 is a sectional elevation showing details of a thermostatic switch device or circuit controller represented diagrammatically in Fig. 1.

Referring to Fig. 1, 10 is a direct current dynamo electric machine, in this instance a dynamo motor adapted for driving connection to an internal combustion engine (not shown) which propels an automobile or the like. At 11 is a storage battery arranged to be charged from the machine 10 when the latter is driven as a dynamo by the internal combustion engine, that is, under normal running conditions. A usual type of high tension ignition system is here illustrated conventionally, the make-and-break device or interrupter being indicated generally at 12 in the primary circuit, and the distributer and spark plugs at 13 and 14, respectively, in the secondary circuit. The circuits connecting the several parts of the system are governed by a switch device having a conductive portion 15 movable into and out of engagement with a group of spring contacts 16, 17, 18, 19, and 20. Of these contacts, 16 is connected to the battery, 17 and 18 to the ignition system, and 19 and 20 to the dynamo electric machine 10. The switch member 15 is carried by a shaft or rod 21 which is mounted for longitudinal movement in bearings 22, 23, at opposite ends of a casing or box 24. A coiled spring 25, under compression, tends to move the switch to its extreme position at the right, as seen in Figs. 2 and 3, where it engages none of the contacts. This is the "off" position of the switch, and it is yieldably held in this position by a spring-controlled stop 26 whose rounded end is arranged to partially enter a groove 27 and to be readily dislodged therefrom by a push on the knob 28 of the switch rod. Another spring stop 29, having a square shouldered end, adapted to enter groove 30, is arranged to automatically lock the switch in off position. This stop can be lifted and held out of the groove in inoperative position by means of a key 31, whose pointed end is adapted to engage a V-shaped groove 32 in stop 29 when the key is thrust inwardly. After being thrust inwardly, with the pins $31^a$ lying in a plane perpendicular to the plane of the drawing, the rod may then be turned to engage said pins in the covered recess $31^b$ to hold the stop device in unlocked position. A locking device of this character is desirable but is not indispensable. If the knob 28 is now pushed in so as to move switch member 15 to its extreme position at the left, or "starting" position, said switch member engages all the contacts; and when the knob is released, spring 25 moves the switch toward the right until it is arrested by the engagement of stop 26 in a groove 33 in the switch. This is "running" position, in which, as is shown in Fig. 3, the switch does not engage contacts 18 and 20. The switch may be moved into "off" position either manually, by a pull on knob 28, or automatically by mechanism now to be described.

The lead connecting contact 19 with the dynamo motor 10 contains a heating coil 34 surrounding a thermostatic element 35 but insulated therefrom by suitable non-conductive material 35[a]. Said element may take the form of a compound strip of two metals having different thermal coefficients of expansion. For convenience in adjusting the thermostatic element, it is fixed at one end on a flexible support 36, provided with an adjusting screw 37. The metals of the compound strip are so arranged that when the temperature of the strip rises, its free end moves upwardly; and if the temperature rises sufficiently high, said free end strikes flange 38 of the nut 39 which is carried by stop 26, lifting the stop and thereby releasing switch rod 21, which is thereupon moved to off position by its controlling spring. In order to allow for changes in atmospheric temperature, the free end of the thermostatic element has a slight play between flanges 38 and 40 of the nut. The position of the nut on the stop may be adjusted as desired, and the nut locked in place by a jam nut 41. Upward movement of the stop is opposed by spring 42 bearing on the lower nut flange.

Evidently the thermostatic device may take other forms. Thus the element 35 may be designed to be included in the circuit and to be self-heating. It may also be arranged to constitute a stop instead of using a separate stop member 26. The construction shown has practical advantages, however.

A cover 43 protects the switch mechanism and also a non-inductive regulating resistance 44 which is inserted in the connection between contact 17 and the transformer 45 of the ignition system. The transformer is conveniently housed below the switch mechanism in an extension of the casing 24, the whole forming a compact unit adapted to be mounted on the dash of an automobile. In Fig. 1, the switch rod 21 is represented diagrammatically as extending through such a dash at 46, a stop 47 being provided on the rod to limit its forward movement. Nut 48 limits movement in the opposite direction.

A hand switch 49, which may be mounted on the dash as usual, is shown in the primary ignition circuit. Such a switch is evidently not essential in the system here described where the plunger switch controls the ignition circuit as well as the dynamo circuit.

The operation of the system above described is clear from what has been said, but will be briefly summarized. Assuming the switch to be in "off" position, as shown in Figs. 2 and 3, the battery is disconnected from both the dynamo electric means and the ignition system. To start the engine, the operator first releases switch rod 21 by manipulating key 31, if the switch lock is employed, and then pushes the knob 28 manually or with his foot to force the switch as far to the left as possible against the resistance of the controlling spring 25 into starting position and holds it there. The switch member 15 now engages all of the contacts. Heating coil 34 is now bridged through contact 20, permitting the dynamo motor to draw a heavy current directly from the battery at the moment of starting, and enabling it to exert a strong torque on the engine crank shaft; while at the same time the heating coil is unaffected. The heating coil is designed to carry the normal battery-charging current from the dynamo under running conditions without heating up; but the starting current is much heavier and if it had to pass through the heating coil, the latter would quickly heat up and withdraw stop 26. If, under these conditions, the knob 28 were released by the operator, the switch would be thrown back to off position, instead of being arrested in running position by engagement of the stop in groove 33, as it is in the present arrangement.

It is to be noted also that in starting position, resistance 44 in the ignition circuit is also bridged through contact 18. This is desirable since it enables the battery to send a sufficiently heavy current directly to the primary of the ignition coil when starting, even though the battery voltage may have dropped somewhat below normal by reason of the temporary heavy pull of the dynamo electric machine on the battery, or by reason of some other cause. In other words, this arrangement permits increasing the ampere turns of the primary when the machine is connected to the battery for starting the engine.

It will be noted that this result is achieved without changing the connections of the battery or altering the relation of the cells to increase the voltage above the normal operating voltage. An arrangement essentially similar to this is disclosed in my copending application, Serial No. 22,085, filed April 17, 1915, of which the present application is a continuation in this respect.

When the engine has speeded up, the operator releases the switch knob, and spring 25 moves the switch back until it is arrested and held in running position by stop 26, as previously explained. The dynamo electric machine is now driven by the engine and charges the battery through regulating coil 50, or other suitable regulating means, and also through heating coil 34, which latter, as stated, can carry the normal charging current without operating the thermostatic release.

When the operator desires to stop the engine, he pulls the switch into off position, the stop 26 yielding to permit this. If, however, the engine stalls with the switch in running position, there is a heavy reverse flow of current from the battery to ground through the low resistance armature of the dynamo electric machine. This discharge current, being much larger than the normal charging current, causes the thermostatic release to operate after a very brief delay, and to withdraw stop 26 from groove 33, thus permitting the spring 25 to move the switch to its off position at the extreme right, whereby both the dynamo and ignition circuits are automatically broken, preventing damage to the armature and discharge of the battery. This automatic operation also prevents the battery discharging through the primary ignition circuit and heating the transformer in case the engine stalls on a high point of the interrupter cam 51.

The brief delay in the operation of the thermostatic release is desirable because otherwise it would throw the switch out whenever the engine stalled only momentarily.

Figure 4:
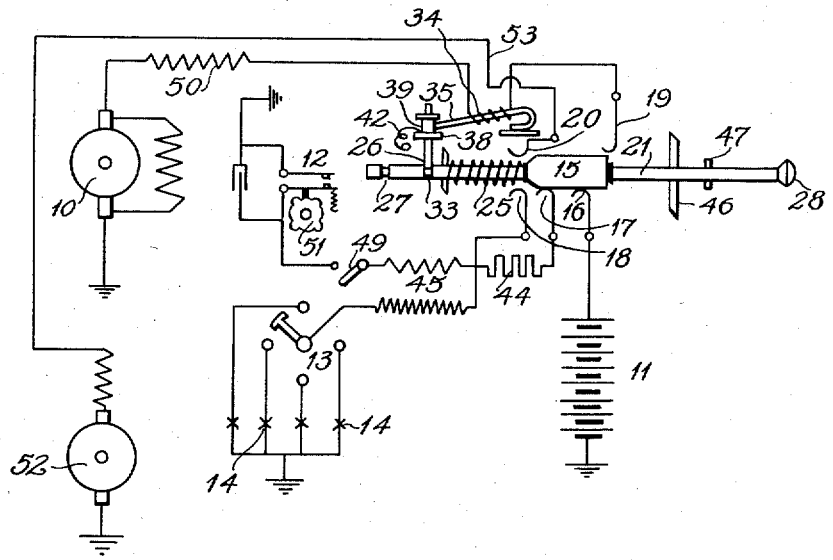
Fig. 4 is a circuit lay-out of another embodiment of the invention.

In a 2-unit system, such as that shown in Fig. 4, for example, where a motor 52 is used for starting, while machine 10 operates as a dynamo to charge the battery the motor lead 53 may be brought to contact 20, machine 10 being no longer connected thereto. In starting position, the switch therefore permits the battery to deliver starting current directly to the motor 52 independently of the thermostat device; and if necessary either switch member 15 or contact 19 may be so arranged that machine 10 is disconnected from the battery when starting, an arrangement obviously applicable also to the single unit system first described. In running position, on the other hand, motor 52 is entirely cut out, dynamo 10 charging the battery through the protective thermostat coil as before. The expression "dynamo electric means" employed in certain of the appended claims is intended to cover the use of either one or two machine units in a system of the character herein disclosed.

Obviously the described system may be arranged to supply current for lighting purposes also, but it is deemed unnecessary to illustrate the details of such arrangement.

What I claim is:

1. In an electrical starting system for use with internal combustion engines, the combination, with a dynamo motor adapted to drive and to be driven by an internal combustion engine, and a storage battery adapted to be charged by said dynamo motor when the latter is being driven as a generator, and to deliver current thereto for operating it as a motor to start or crank the engine, of a movable switch member adapted to complete a circuit whereby the dynamo motor, when driven, may charge the battery, thermostatic means operable by excessive flow of current in said circuit to effect movement of said switch member and to open said circuit, said switch member being also movable to connect the battery directly to said dynamo motor, whereby said dynamo motor may draw a heavy starting current from the battery without operatively affecting said thermostatic means.

2. The combination with a dynamo motor adapted for driving connection to an internal combustion engine, and a storage battery, of suitable circuit connections affording different current paths between said dynamo motor and storage battery, current-responsive control means in one of said paths, switch means movable to connect the battery and dynamo motor either through that path alone, or directly through the other path, and also to disconnect them, and means governed by said current-responsive control means for moving said switch means into disconnecting position.

3. In an electrical starting system for use with internal combustion engines, the combination, with a dynamo motor adapted for driving connection to an internal combustion engine, of a contact electrically connected to the battery, a second contact electrically connected to the dynamo motor, switch means movable into "starting" position, "running" position and "off" position, and electrically connecting said contacts when in running position, a spring tending to move said switch means into off position, detent means normally preventing such movement but releasable by excessive flow of current between the battery and dynamo motor when the switch means is in running position, and a third contact electrically connected to said dynamo motor, said switch means being arranged when in starting position to electrically connect said first and third contacts, the connection between the dynamo motor and battery, for this position of the switch, being such that heavy starting current may flow from the battery without affecting the operation of said detent means.

4. In an electrical starting system for use with internal combustion engines, the combination, with a dynamo motor adapted to drive and to be driven by an internal combustion engine, and a storage battery adapted to be charged by said dynamo motor when the latter is being driven as a generator, and to deliver current thereto for operating it as a motor to start or crank the engine, of a movable switch member adapted to complete a circuit whereby the dynamo motor, when driven, may charge the battery, current-responsive means operable by a predetermined flow of current in said circuit to effect movement of said switch member and thereby to open said circuit, said switch member being also movable to connect the battery directly to said dynamo motor, whereby said dynamo motor may draw a heavy starting current from the battery without operatively affecting said current responsive means.

5. In an electrical starting system for use with internal combustion engines, the combination, with dynamo electric means adapted for driving connection to an internal combustion engine, and a storage battery arranged to be charged from said dynamo electric means and to deliver current thereto, of a switch device, thermostatic means operable by excessive flow of current between said dynamo electric means and battery to effect movement of said switch device and thereby to disconnect said dynamo electric means and battery, said switch device being also movable to connect said dynamo means directly to the battery when starting the engine.

6. An electrical starting and ignition system for use with internal combustion engines comprising, in combination, dynamo electric means adapted for connection to an internal combustion engine, a storage battery adapted to be charged from the dynamo electric means and to deliver current thereto, an ignition system, circuit connections, and switch means movable into different positions to coöperate with said connections, the switch means, when in one position, connecting the battery directly to the ignition system and to the dynamo electric means, and, when in a second position, connecting the battery to the ignition system through a resistance, and to the dynamo electric means through a thermostatic device operable upon excessive flow of current therethrough to disconnect the battery from both the dynamo electric means and the ignition system.

7. In apparatus of the character described, the combination, with a dynamo electric machine adapted to start an internal combustion engine, and a battery arranged to supply current to said machine, of an ignition coil having a primary connected to said battery, means for changing the circuit connections to increase the ampere turns of the primary when said machine is connected to the battery for starting purposes without altering the relation of the battery cells, and means tending automatically to render the first mentioned means inoperative to so increase the ampere turns.

8. In apparatus of the character described, the combination, with a dynamo electric machine adapted to start an internal combustion engine, and a battery arranged to supply current to said machine, of an ignition coil having a primary connected to said battery, switch means movable to connect said battery to said machine for starting the engine and at the same time to increase the ampere turns of the primary without altering the relation of the battery cells, and resilient means tending to move said switch means out of such starting connection.

9. In apparatus of the character described, the combination, with a dynamo electric machine adapted to start an internal combustion engine, and a battery arranged to supply current to said machine, of an ignition coil having a primary connected to said battery, switch means movable to connect said battery to said machine for starting the engine and at the same time to increase the ampere turns of the primary, and thermostatic means operable by excessive flow of current from the battery to disconnect said primary from the battery.

10. In an electrical system for use with internal combustion engines, the combination, with a source of electric current and engine-starting means arranged to be energized thereby, of an ignition circuit also arranged to be energized from said source, and means operable to permit an increased flow of current through said ignition circuit while the engine is being started without increasing the voltage of said source above its normal operating voltage.

11. In an electrical system for use with internal combustion engines, the combination, with a source of electric current and engine-starting means arranged to be energized thereby, of an ignition circuit also arranged to be energized from said source, and means for decreasing the normal resistance of said ignition circuit while the engine is being started.

12. In an electrical system for use with internal combustion engines, the combination, with a dynamo motor whose armature shaft is adapted to drive or to be driven by an internal combustion engine, and a storage battery arranged to supply current to said dynamo motor when the latter operates as a motor, and to be charged from said dynamo motor when the latter is driven as a generator, of an ignition system for such engine arranged to take current from said battery, a resistance, and switch means movable to connect said battery directly with said ignition system when the engine is to be started, or through said resistance when the engine has speeded up and is driving said dynamo motor as a generator.

13. In an electrical system for use with internal combustion engines, the combination, with a dynamo motor whose armature shaft is adapted to drive or to be driven by an internal combustion engine, and a storage battery arranged to supply current to said dynamo motor when the latter operates as a motor, and to be charged from said dynamo motor when the latter is driven as a generator, of an ignition system for such engine arranged to take current from said battery, and means operable to permit an increased flow of current from said battery to said ignition system when the engine is being started, the arrangement being such that the relation of the battery cells remains the same.

14. In an electrical system for use with internal combustion engines, the combination with a storage battery and an electrical motor in circuit therewith and adapted to crank the engine, of an ignition coil for supplying ignition current to said engine, and means operable to permit a greater flow of current through said ignition coil from said battery when the motor cranks the engine, and to reduce the flow of current through said coil when the motor is not cranking the engine, the relation of the battery cells remaining the same under both conditions of operation.

15. In an electrical system for use with internal combustion engines, the combination, with a storage battery, a dynamo electric machine arranged to be energized thereby and operable to start said engine, and an ignition system for the engine also arranged to be energized by said battery, of means effective, when the engine is being started, to insure sufficient energization of the ignition system at the lower battery voltage resulting from the starting pull on the battery by the dynamo electric machine, the arrangement being such that the relation of the battery cells remains the same.

16. In a starting and ignition apparatus for internal combustion engines, a dynamo electric machine for turning over or starting the engine, a battery for supplying current to said machine, an ignition coil having a primary connected to the battery, and means for increasing the ampere turns of the primary when said machine is connected to the battery for starting purposes without changing the connections of the battery.

17. In a starting and ignition apparatus for internal combustion engines, a dynamo electric machine for turning over or starting the engine, a battery for supplying current to said machine, an ignition coil having a primary connected to the battery, and a switch for varying the connections of the primary circuit so as to compensate for the decrease in battery voltage when the battery is connected to the said machine for starting purposes, the arrangement being such that the relation of the battery cells remains the same.

18. In a starting and ignition apparatus for internal combustion engines, a dynamo electric machine for turning over or starting the engine, a battery for supplying current to said machine, an ignition coil having a primary connected to the battery, a switch for controlling the connections between the battery and dynamo electric machine, and means operative upon the shifting of said switch for compensating for the decrease in battery voltage, and hence in voltage impressed upon the primary coil when the battery is connected to said machine for starting purposes, the arrangement being such that the relation of the battery cells remains the same.

19. In a starting and ignition system for internal combustion engines, a starting motor, a battery for supplying current thereto, an ignition coil having a primary connected to the battery, a unitary switching mechanism for connecting the battery to the motor and simultaneously varying the normal connections of the primary circuit so as to increase the primary ampere turns and compensate for the drop in battery voltage when the battery is connected to the motor, the relation of the battery cells being unchanged by operation of said switching mechanism.

20. In a starting and ignition apparatus for internal combustion engines, a dynamo electric machine adapted to serve as a motor to start the engine, a battery for supplying current to said machine, an ignition coil having a primary normally connected to the battery, a switch for controlling the connections between said machine and the battery, and means operative upon the shifting of said switch for increasing the ampere turns of the primary when said machine is connected to the battery for starting purposes without altering the connections of the battery or changing the relation of the cells thereof.

21. In starting and ignition apparatus the combination of an internal combustion engine, an electric motor for starting said engine, a battery for supplying current to said motor, a switch for connecting and disconnecting said motor and said battery, an ignition coil having a primary winding connected to said battery, a resistance in series with said primary winding and a switch for short circuiting said resistance, to increase the ampere turns of said primary winding when said motor is connected to said battery for starting said engine.

22. In an ignition system for internal combustion engines, the combination with an induction coil, a battery, a primary circuit connected thereto, including the primary winding of said induction coil and a current interrupter, of a secondary circuit including the secondary winding of an induction coil, a distributer located therein, a series of spark plugs through which said secondary circuit is successively closed by said distributer and means in said primary circuit to increase the number of ampere-turns of said primary winding when the voltage of the battery is insufficient to induce a sufficiently strong current in the secondary to ignite the charge.

In witness whereof I hereunto affix my signature.

JAMES K. DELANO.